D. MACK.
Lawn-Mowers.

No. 148,474.  Patented March 10, 1874.

WITNESSES:
Phil. W. Hult,
W. W. J. Murphy

INVENTOR
David Mack
per
F. A. Lehmann, Atty

AM. PHOTO-LITHOGRAPHIC CO. N.Y. (OSBORNE'S PROCESS.)

UNITED STATES PATENT OFFICE.

DAVID MACK, OF BARNESVILLE, KANSAS.

IMPROVEMENT IN LAWN-MOWERS.

Specification forming part of Letters Patent No. 148,474, dated March 10, 1874; application filed January 19, 1874.

*To all whom it may concern:*

Be it known that I, DAVID MACK, of Barnesville, in the county of Bourbon and State of Kansas, have invented certain new and useful Improvements in Lawn-Mowers; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in lawn-mowers; and it consists in the arrangement and combination of devices, which will be more fully described hereafter, whereby a simple, cheap, and efficient hand-mower for lawns and gardens and other places is produced.

Figure 1:
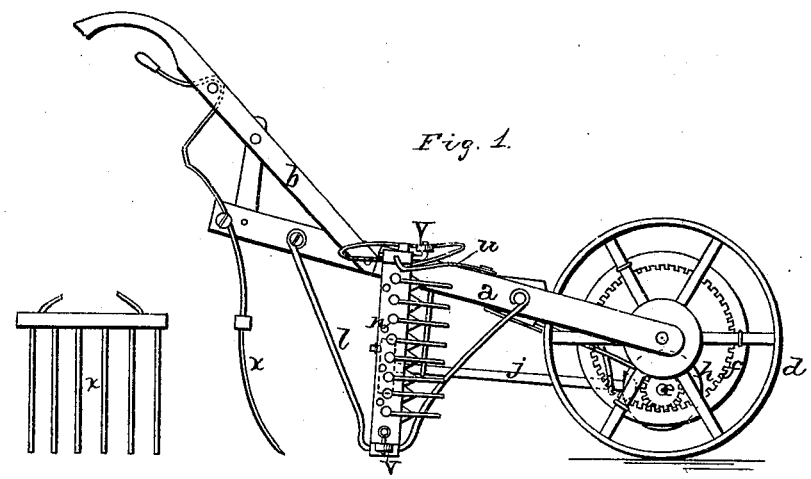
Figure 2:
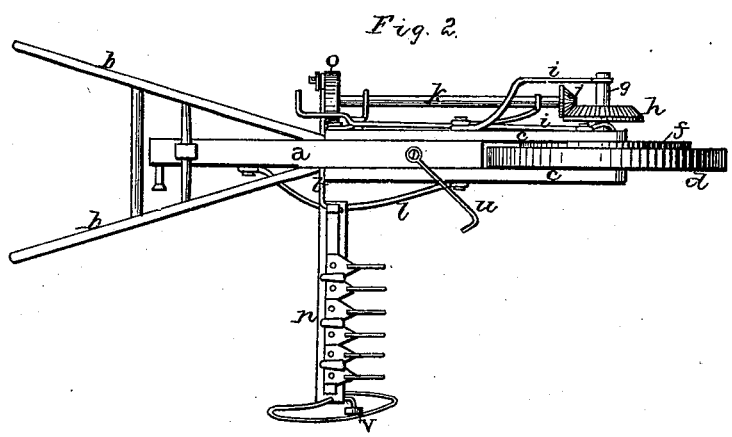

Figure 1 represents a side elevation of my invention. Fig. 2 is a plan view of the same.

$a$ represents a beam, provided with the handles $b$, of any suitable construction. Secured to each side of the beam is a bar, $c$, which project forward and form journals for the shaft of the driving-wheel $d$. Secured by any suitable devices to the spokes of this wheel is an internally-toothed rim, $f$, which revolves with the wheel, and operates the pinion $e$ on the inner end of the shaft $g$. This shaft is supported in a horizontal position by means of the two braces $i$, fastened to the side bar $c$. Secured to this shaft is a second wheel, $h$, of any suitable form, larger than the pinion $e$, and with which the small beveled gear $j$ on the end of the crank-shaft $k$ engages. Pivoted upon the bent downwardly-projecting rod $l$ is the mowing attachment $n$, the cutter-bar of which is attached to the crank $o$ by the connecting-rod $t$. This attachment is provided with suitable rollers $v$, and which, when not in use, or when the machine is being moved about from place to place, can be raised vertically, so as to be out of the way, and held in this position by the catch or hook $u$.

By means of the devices above described the grass upon lawns, door-yards, and other places too small to conveniently use a large machine can be easily and rapidly cut. It is also especially adapted to be used in fence-corners. By means of a lever which is connected to the shaft of the operating-pinion, and which extends back to the handles, the pinion can be thrown out of gear, so that the machine can be moved about without operating the cutter-bar. After the grass has been cut the cutter-bar can be detached and taken out, and then a rake, $x$, attached to the side of the machine for raking up the grass; or the cutter-bar can be turned up out of the way and the rake attached in its rear, as shown.

Having thus described my invention, I claim—

The combination of the beam $a$, provided with handles $b$, driving-wheel $d$, toothed rim $f$, pinions $e j$, shaft $g$, gear $h$, crank-shaft $k$ $o$, connecting-rod $t$, and mowing attachment, substantially as shown.

In testimony that I claim the foregoing I have hereunto set my hand this 10th day of January, 1874.

DAVID MACK.

Witnesses:
FRANK MESSINGER,
ALEXANDER PATTERSON.